Patented July 29, 1924.

1,502,888

UNITED STATES PATENT OFFICE.

GEORGE S. TITUS AND FRANK M. GROUT, OF MINNEAPOLIS, MINNESOTA.

PROCESS OF MAKING LEAVENED BREAD.

No Drawing.   Application filed January 24, 1923.  Serial No. 614,677.

*To all whom it may concern:*

Be it known that we, GEORGE S. TITUS and FRANK M. GROUT, citizens of the United States, residing at Minneapolis, in the county of Hennepin and State of Minnesota, have invented certain new and useful Improvements in Processes of Making Leavened Bread; and we do hereby declare the following to be a full, clear, and exact description of the invention, such as will enable others skilled in the art to which it appertains to make and use the same.

This invention relates to a process of making bread and particularly, to a process of making leavened bread. The making of leavened bread, as now generally practiced commercially, is carried on in one of two ways, known respectively as the sponge process and as the straight dough process. In the sponge process, it is customary to make a preliminary mixture consisting of approximately fifty to sixty per cent of the flour with fifty to a little more than sixty per cent of the water and usually all of the yeast. These ingredients are mixed either by hand or in suitable machinery and the mixture then withdrawn from said machinery and allowed to ferment for a suitable period in a baker's trough. Toward the end of this period of fermentation, the sponge recedes or "falls" and if allowed to stand a little while longer it again rises. Usually at this point of the fermentation the mixture is withdrawn from the trough and placed again in the mixing machine wherein it receives the balance of the flour, water, sugar, malt, lard, salt, milk or such other ingredients as the baker may use. It is then thoroughly mixed under proper conditions and temperature, and is then again withdrawn from the mixer and again permitted to ferment. After this period the dough batch is usually sectioned off into loaves, molded, proofed, either in boxes or a suitable proofing cabinet and then baked.

The straight dough process may be described as one in which the preliminary sponge process step is eliminated. All of the various ingredients to be used are thoroughly incorporated with each other and mixed in a suitable mixing machine or by hand at the beginning of the operation. There are various differences in the manipulation of the dough owing to differences in temperatures, amount of yeast used, types of flour employed, etc. After the dough is mixed it is fermented for a suitable period of time and then the same general procedure as described in the manufacture of the sponge dough is followed. The general practice of the manufacture of bread by either the sponge or the straight dough processes differs in details for different baking establishments according to the skill, knowledge, or preference of the particular operator and the amounts of the various materials also vary according to the various formulæ preferred.

The various operations included in the two processes are well known to those versed in the art and further description is not necessary.

It is generally accepted that the processes of manufacturing bread either by the sponge dough process or the straight dough process have a two-fold purpose. The first one is to mature and develop that portion of the flour known as gluten with the idea of making it tougher, more elastic and pliable. Gluten is the name commonly used to designate a certain portion of the flour. It is, in its moist state a rather soft, sticky and elastic substance. The second purpose is to increase and stimulate the production of yeast. The yeast preliminarily introduced in the bread making process grows and thrives under the conditions provided for it in the dough batch. The action of this yeast is to establish alcoholic fermentation forming alcohol and carbon dioxide. The gluten retains the carbon dioxide and it is the expansion of this gas that makes the bread light. Hence, the more elastic and tenacious the gluten the greater the volume that can be obtained. It is generally agreed by all experts in the art of making bread that increase in volume together with fineness of grain and texture without loss of flavor is most desirable both from the view point of the baker and of the consumer.

It is also well known that certain waters effect the manufacture of bread in a decided manner. Certain waters have an adverse effect on fermentation while other waters accelerate and expedite fermentation. The difference in action of these waters is due to the different salts contained therein. The applicants do not claim to have discovered the action of these salts on the fermentation process but, generally speaking, it may be stated that it is now well known in the baking art that particularly the salts of calcium, ammonium and potassium have a decided effect upon fermentation and especially when combined with certain compounds of the bromine or iodine group.

It is an object of this invention to provide a new and improved method of making bread which, while using substantially the same ingredients as heretofore, will result in a bread of increased volume, improved grain, texture and flavor which at the same time is whiter than bread produced with the same ingredients by other processes.

It is a further object of the invention to provide such a method of making bread in which the gluten is matured and developed and rendered tougher, more elastic and pliable in a preliminary step of the process.

It is more specifically an object of the invention to so effect the gluten by preliminarily mixing a certain definite portion, preferably the greater part of the flour and water to be used with a small percentage of suitable salts, and then allowing such mixture to stand for a considerable period before the yeast and the remainder of the ingredients are added and the batch fermented.

These and other objects and advantages of the invention will more fully appear from the following description, describing the various steps pursued.

As above stated, it is now known that certain salts have a stimulating action upon the yeast plant, accelerating and increasing its production and the secretions thereof. Such salts include certain mineral and other salts, particularly when combined with elements of the halogen group. Such salts include ammonium chloride, calcium sulphate and potassium bromate, and certain other similar compounds. These salts are now generally used by bakers in the bread making operation and one product widely known to the trade comprising certain of such salts is widely used commercially and known as Arkady. Such salts and their action on the yeast is disclosed in U. S. Patent to Kohman, et al., 1,158,933 and 1,158,934, granted November 2nd, 1915; Kohman, et al., 1,148,328 and 1,148,329, granted July 27, 1915; Kohman, et al., 1,151,526, granted August 24, 1915, and Wahl, 1,242,396, granted October 9, 1917. The action of such salts, as set forth in said patents on the yeast is now well known and, as set forth herein and disclosed in said patents, such compounds include the mineral salts sodium, calcium and potassium combined with the elements of the halogen group and also includes calcium sulphate. These salts and compounds will herein be referred to and designated as "yeast stimulating salts" or "salts characterized by their yeast stimulating property" and will be so referred to in the claims. This substance will be referred to in the claims and while said substance constitutes a well known commercial product it is not intended to limit the invention to such specific product as any similar mixture or composition of salts having a similar action would serve the same purpose and be the full equivalent thereof and be within the scope of this invention.

In the present process, a certain part of the flour to be used, preferably the greater portion thereof, constituting from fifty to one hundred per cent of the same, is mixed with a certain definite portion of the water to be used, preferably the greater portion thereof which portion also constitutes from 50% to 100% of the same. To this mixture is added from one-tenth of 1% to 2% of Arkady or a similar substance. These substances are then thoroughly mixed in a suitable mixing machine or by hand at the ordinary temperatures employed in bread manufacture. After having been so mixed the product is permitted to stand in a mixer or in the baker's trough for from one hour to five hours, or longer, depending on the environment, temperature conditions, amount of Arkady used and other variable conditions. While, as stated, portions of the flour and water to be used varying from 50% to 100% may be thus mixed, it has been found most advantageous to use from 90% to 95% of the total flour mixed with from 90% to 95% of the total water employed with from one-tenth of 1% to 1% of the substance Arkady or other suitable substance. The action resulting from the above steps is to mature, mellow and toughen the gluten present in the flour and a decided bleaching effect is also produced upon the dough mass. After the above stated mixture has been allowed to stand, as described, the same is then again placed in the mixing machine and the remainder of the flour and water to be used are added thereto, together with the yeast and the remaining usual ingredients used such as sugar, salt, milk, malt, lard, or other shortening substance, etc. After the ingredients are again mixed the batch is withdrawn from the mixer and again allowed to stand in a baker's trough from one and one-half to four hours, according to room conditions, amount of yeast used, etc. After this, it is then scaled, molded, proofed and baked off in the usual way.

The above described process has been employed upon flours of different degrees of strength or flours having different amounts of gluten and upon flours of wholly dissimilar characteristics. The results of such uses and tests made have proved that by using the method of the present invention an increase of 1% to 2% in absorption can be obtained. This is due to the fact that the physical state of the gluten has been changed so that a larger percentage of water can be absorbed and retained in the dough mass without producing a dough that would be called "sticky". Many tests have also been made employing both of the old and commonly known sponge or straight dough processes with a certain group and ratio of ingredients and then the same group and ratio of ingredients used with the present process and in every case it is found that the bread produced by the process of the present invention was considerably whiter than the bread produced by the ordinary method. This white effect or bleaching process is particularly noticeable on bread made of unbleached flour.

The mellowing and toughening effect on the gluten manifests itself in the larger volume than it is possible to obtain in the finished loaf as compared to the volume obtained from the same materials used in the same proportions in either of the old well known methods of bread manufacture. Furthermore, not only is this increased volume obtained without injuring the grain, texture and flavor of the bread but such grain, texture and flavor are decidedly improved. It is well known that increased volume of bread can easily be obtained by sacrificing the quality of grain and texture as well as the flavor. As above stated, it is a great desideratum in bread manufacture to obtain increased volume when this can be done without lowering the quality of the grain, texture or flavor. In the present process, the volume is increased and at the same time the grain, texture, and flavor are improved.

It may be stated that trouble is experienced by bakers at the beginning of each crop year in handling freshly milled flour or flour which has been milled from new wheat. This is due to the fact that the gluten naturally in the flour is of a short fibrous nature and it is difficult to mature and toughen this gluten in the fermentation process to such an extent as to produce a loaf of the desired volume. By the present process, such freshly milled flour or flour made from new wheat can be handled and the gluten therein toughened to such an extent that it will have all of the characteristics of a flour of a considerable age and maturity and the baker can thus use such flour as advantageously and with as little difficulty as an old flour. The specific nature of the action on the gluten is not entirely understood but it is plain that there is both a chemical and physical change produced therein, probably including both an oxidizing and an enzymic action and the gluten is thus conditioned before there has been any introduction of yeast into the batch. The yeast can therefore act on the flour much more advantageously than if the gluten had not been so preliminarily treated.

The herein described invention is also applicable to rye and other flours as generally used in bread manufacture as well as to wheat flour.

From the above description it is seen that applicants have invented a greatly improved process of bread manufacture and one obviously having great utility. In the improved process, the same materials are used as have usually been used in other methods of bread making so that there is no additional expense involved. The product of the process is, however, as above set forth, a great improvement over the product resulting from the processes of the prior art. As above stated, many tests have been made using the present method and comparing the same to previous methods and the process has been found to be entirely practical, efficient and successful.

It will, of course, be understood that various changes may be made in the sequence of the steps and in the kind, number and proportions of the materials used without departing from the scope of applicants' invention, which, generally stated, consists in the matter described and set forth in the appended claims.

What is claimed is:

1. The method of making leavened bread which consists in toughening and maturing the gluten in the flour used by mixing together certain definite portions of the flour and water to be used together with a relatively small amount of suitable yeast stimulating salts, then allowing said mixture to stand for a considerable period, afterwards adding the yeast and other constituents of the bread and fermenting the batch.

2. The method of making leavened bread which consists in mixing from 50% to 90% of the flour to be used, with from 50% to 90% of the water to be used, together with from one-tenth of 1% to 2% of suitable salts characterized by their yeast stimulating properties and then allowing said mixture to stand for a considerable period to mature and toughen the gluten content of the flour, then adding the remainder of the flour and water together with the yeast and other ingredients and fermenting the batch.

3. The method of making leavened bread which consists in mixing with from 50% to 90% of the flour to be used, from 50% to 90% of the water to be used, together with from one-tenth of 1% to 2% of suitable yeast stimulating salts and then allowing said mixture to stand for a considerable period to mature and toughen the gluten content of the flour and bleach the mixture, then adding the remainder of the flour and water together with the yeast and other ingredients, mixing all of said ingredients, allowing the mixture again to stand for a considerable period and then scaling, molding, proofing and baking the dough of the batch.

4. The method of making bread which consists in mixing from 50% to 90% of the flour to be used with from 50% to 90% of the water to be used, together with from one-tenth of 1% to 2% of suitable salts characterized by their yeast stimulating properties and after said substances have been thoroughly mixed permitting the mixture to stand for from one to five hours, then mixing the resulting product with the remainder of the flour and water to be used together with the yeast and other ingredients and after the same have been thoroughly mixed, permitting the resulting mixture to stand for from one and one-half to four hours, then proceeding to proof and bake the bread.

5. The process of making bread which consists in mixing approximately 90% of the flour to be used with approximately 90% of the water to be used together with from one-tenth of 1% to 1% of suitable yeast stimulating salts and after the said substances have been thoroughly mixed, permitting the mixture to stand for from one to five hours before the yeast and other ingredients are added and the batch fermented.

6. The step in the method of making bread which consists in mixing from 50% to 90% of the flour to be used with from 50% to 90% of the water to be used together with from one-tenth of 1% to 2% of suitable salts characterized by their yeast stimulating properties and after said substances have been thoroughly mixed, allowing the same to stand for a considerable period of time to render the gluten tougher, more elastic and pliable and to bleach the mixture.

In testimony whereof we affix our signatures.

GEORGE S. TITUS.
FRANK M. GROUT.